United States Patent [19]

Vianco et al.

[11] Patent Number: 5,439,639
[45] Date of Patent: Aug. 8, 1995

[54] TIN-SILVER-BISMUTH SOLDERS FOR ELECTRONICS ASSEMBLY

[75] Inventors: Paul T. Vianco; Jerome A. Rejent, both of Albuquerque, N. Mex.

[73] Assignee: Sandia Corporation, Albuquerque, N. Mex.

[21] Appl. No.: 177,504

[22] Filed: Jan. 5, 1994

[51] Int. Cl.$^6$ .............................................. C22C 13/02
[52] U.S. Cl. ................................... 420/562; 148/400
[58] Field of Search .................. 420/562, 559, 561; 148/400, 405; C22C 13/00, 13/02

[56] References Cited

U.S. PATENT DOCUMENTS

| | | | |
|---|---|---|---|
| 3,607,253 | 9/1971 | Cain et al. | 420/562 |
| 4,695,428 | 9/1987 | Ballentine et al. | 420/561 |
| 4,760,217 | 7/1988 | Suzuki et al. | 200/5 A |
| 4,929,423 | 5/1990 | Tucker et al. | 420/561 |

FOREIGN PATENT DOCUMENTS

0499452A1 12/1992 European Pat. Off.
5-228685 9/1993 Japan.

OTHER PUBLICATIONS

Vianco, Paul T., "An Overview of the Meniscometer/Wetting Balance Technique For Wettability Measurements," *The Metal Science of Joining*, pp. 265–284, Proceedings, Oct. 20–24, 1991.

Chirino, O. I., et al., "High Creep Strength Alloy", *IBM Technical Disclosure Bulletin*, vol. 23, No. 8 p. 3620, Jan. 1981.

Vianco, Paul T., and Yost, Frederick G., "A Ban on Use of Lead–Bearing Solders, Implications for the Electronics Industry," *Sandia Report, SAND92-0211, UC-904*, pp. 1–10, Apr. 1992.

*Primary Examiner*—David A. Simmons
*Assistant Examiner*—Sean Vincent
*Attorney, Agent, or Firm*—Timothy D. Stanley; George H. Libman

[57] ABSTRACT

A lead-free solder alloy for electronic assemblies composed of a eutectic alloy of tin and silver with a bismuth addition, x, of $0 < x < 5$ percent by weight based on the weight of tin effective to depress the melting point of the tin-silver composition to a desired level. Melting point ranges from about 218° C. down to about 205° C. depending an the amount of bismuth added to the eutectic tin-silver alloy as determined by DSC analysis, 10° C./min. A preferred alloy composition is 91.84Sn-3.33Ag-4.83Bi (weight percent based on total alloy weight).

8 Claims, 4 Drawing Sheets

TIN-SILVER-BISMUTH SOLDERS FOR ELECTRONICS ASSEMBLY

The United States Government has rights in this invention pursuant to Contract No. DE-AC04-76DP00789 between the Department of Energy and American Telephone and Telegraph Company.

BACKGROUND OF THE INVENTION

This invention relates to solder compositions. More specifically, this invention relates to lead-free solder compositions useful for electronics assembly.

DESCRIPTION OF THE PRIOR ART

Solders have played a significant role in the electronics industry. Specifically, solder technology has provided the chief means whereby individual devices are attached to printed wiring boards (PWBs) or ceramic substrates (hybrid microelectronics). For example, a 12-inch square PWB may contain as many as several thousand solder joints. The primary solder alloy used for PWB assembly at present is the eutectic 63Sn-37Pb (wt. %) alloy. Properties of solders, such as electrical conductivity for signal transmission, thermal conductivity for heat dissipation, and mechanical strength to maintain assembly integrity, make them highly desirable in circuit board assembly processes.

The melting temperatures of solders allow the use of processing temperatures which are sufficiently low to be compatible with both the electronic devices and circuit board substrates. Yet, the melting temperatures allow for solders to maintain joint integrity under most common service conditions. The fact that the solder joint can be remelted after initial formation provides a means for the replacement of defective components and the repair of imperfect joints.

Two important aspects of a solder's ability to wet only exposed metal surfaces and not adhere to the entire PWB surface are that the location and shape of the solder joint can be precisely controlled for optimum electrical, thermal, and mechanical properties, and that selected wetting permits the use of large scale processes (wave soldering, condensation reflow, and infrared furnace reflow) which can produce upwards of a thousand solder joints in a matter of several seconds, yet with a minimum mount of wasted material.

The use of lead in manufactured products, including electronic solders, is coming under increased scrutiny, due to its extreme toxicity and the potential for environmental contamination from discarded electronic assemblies. Lead-bearing solders are such an integral part of electronic systems that a ban on them by legislation or environmental regulation would severely affect the electronics industry if a replacement, lead-free solder is not available.

The successful use of the tin-lead solders has established the physical, mechanical, and electrical properties criteria from which to judge the performance of candidate replacements. The primary properties of interest for electronics assembly are (1) wettability, (2) melting temperature, and (3) material integrity in service.

Numerous lead-free solder alloys are available; however these solders were developed for use by the plumbing industry. The tin-based, lead-free solders are composed primarily of tin with small additions of silver, antimony, or copper in some of the more frequently used alloys. Examples in this category are the 96.5Sn-3.5Ag eutectic alloy (eutectic temperature=$T_e$=221° C.) and the 95Sn-5Sb alloy (solidus temperature=$T_s$=232° C., liquidus temperature=$T_l$=240° C.) solidus. The melting (liquidus) temperatures are higher than that of 63Sn-37Pb solder ($T_e$=183° C.) and necessitate the assessment of heat damage to the devices and substrate prior to considering them for use. On the other hand, these solders have a potential to extend the service temperature window of electronic assemblies owing to their higher melting temperatures. New PWB materials with higher glass transition temperatures which make them more compatible with the higher melting point, tin-based solder have been developed. The use of 100Sn (melting temperature=232° C.) has typically been discouraged in electronic systems because of the potential for tin to form whiskers which may short out connections.

Other binary tin alloys are also potential substitutes for the tin-lead solder. These alloys contain indium or bismuth in nearly equal concentrations with tin. Their melting temperatures are below that of 63 Sn-37Pb. Examples of these solders are the eutectic alloys 58Bi-42Sn ($T_e$=138° C.) and 52In-48Sn ($T_e$=118° C.). The lower melting points of these solders are compatible with most epoxy-based PWB substrates; however, they limit the maximum temperatures for secondary processing of the assembly as well as the allowed temperature range during service.

Lead-free alloy solder compositions for use in the plumbing industry are known as taught, for example, by Tucker et al in U.S. Pat. No. 4,929,423 (1990), Ballentine et al in U.S. Pat. No. 4,695,428 (1987), and Henson et al in U.S. Pat. No. 4,670,217 (1987). The object of these solder compositions is to provide a lead-free solder having nominal melting temperatures and a similar pasty range (i.e. melting range) similar to traditional tin-lead plumbing solders. The solder composition of Tucker, in particular, employs a tin-based solder having up to 1.5% by weight silver, up to 1.5% by weight copper, up to 20% by weight bismuth, and small amounts of phosphorous and rare earth elements. The solder compositions contemplated by Tucker may have as low as 0.01% silver by weight. In the Tucker et al patent, copper appears to be a substantial and essential component. The object of the provision of a large pasty range, i.e., the difference between the liquidus and solidus temperatures, is to provide a range of temperatures over which the solder may be used, and thus enhance ease of use in the joining and sealing of pipes and fixtures in the plumbing industry.

The present invention, in contrast to the plumbing solders above, has the object of providing a lead-free solder useful in the assembly of products in the electronics industry, where a large pasty range is inappropriate. The present invention is directed toward providing a solder having a substantially eutectic composition of silver and tin, having a single melting temperature, with the amount of bismuth added in proportion to tin so as to maintain a solid solution, thereby preventing the formation of extraneous, low temperature phases.

In effect, the base of the present invention is a tin-silver solder with bismuth acting as a dilute solute component with the object of lowering the melting point of the resulting solder. The alloys of Tucker et al, useful in the plumbing industry, would require extensive modification to arrive at the inventive solder compositions of the present invention, intended for use in electronic assemblies. The eutectic tin-silver solder (96.5Sn-3.5Ag, wt. %) has satisfactory wettability and mechanical properties for electronic applications; however, the relatively high melting temperature, 221° C., limits the processing window for many printed wiring board applications. Improvement of the wetting characteristics of the tin-silver solder would decrease the number of potential defects at the time of manufacture. It has been discovered, according to the present invention, that the melting point of the eutectic tin-silver solder (as determined by Differential Scanning Calorimetry, DSC, at a heating rate of 10° C./min) can be depressed to the acceptable range of 205° C. to 218° C. by the addition of bismuth, thus forming a new three component solder with a lower melting point and improved wettability and mechanical properties.

SUMMARY OF THE INVENTION

The present invention relates to lead-free solder compositions useful in the electronics industry for the construction of assemblies such as printed wiring boards (PWBs).

An object of the invention is to provide a lead-free solder.

A further object of the invention is to provide a lead-free solder having an acceptable cost differential with tin-lead solder.

A still further object of the invention is to provide a lead-free solder with melting properties, wetting properties, and mechanical properties such that it is useful for the construction of electronic assemblies.

A still further object of the invention is to provide a lead-free solder which is compatible with existing devices and substrates used for the assembly of electronic systems.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a solder alloy composition for electronic assembly applications consisting essentially of tin, silver, and bismuth, the tin and silver being present in a ratio equal to about the eutectic composition of tin and silver, said bismuth being present as an addition in an amount sufficient to depress the melting point of said tin-silver composition to a desired value.

BRIEF DESCRIPTION OF THE DRAWINGS

The accompanying charts, which are incorporated in and form part of the specification, further illustrate the present invention and, together with the description, serve to explain the principles of the invention.

DETAILED DESCRIPTION OF THE INVENTION

The use of lead in manufactured products, including electronic solders, is coming under increased scrutiny due to its extreme toxicity and potential contamination hazard to the environment. Lead-bearing solders are such an integral part of electronic systems that a ban on them by legislation or environmental regulation, will severely affect the electronics industry if a suitable replacement, lead-free solder is not available. The success of the tin-lead solders has established the physical, mechanical, and electrical properties criteria from which to assess the performance of candidate replacements. The primary properties of interest for electronics assembly are (1) wettability, (2) melting temperature, and (3) mechanical integrity. Desired criteria for a lead-free solder alloy are (1) a single melting (phase) transition as in a eutectic composition, or a 5° C. to 7° C. melting range between the solidus and liquidus temperature, which is acceptable to benefit reflow on surface mount technology; (2) melting temperatures (DSC, 10° C./min) in the range of 205° C. to 218° C., higher than customary tin-lead solders (183° C.) to increase service temperatures for electronic assemblies; and (3) have low toxicity.

Figure 1:
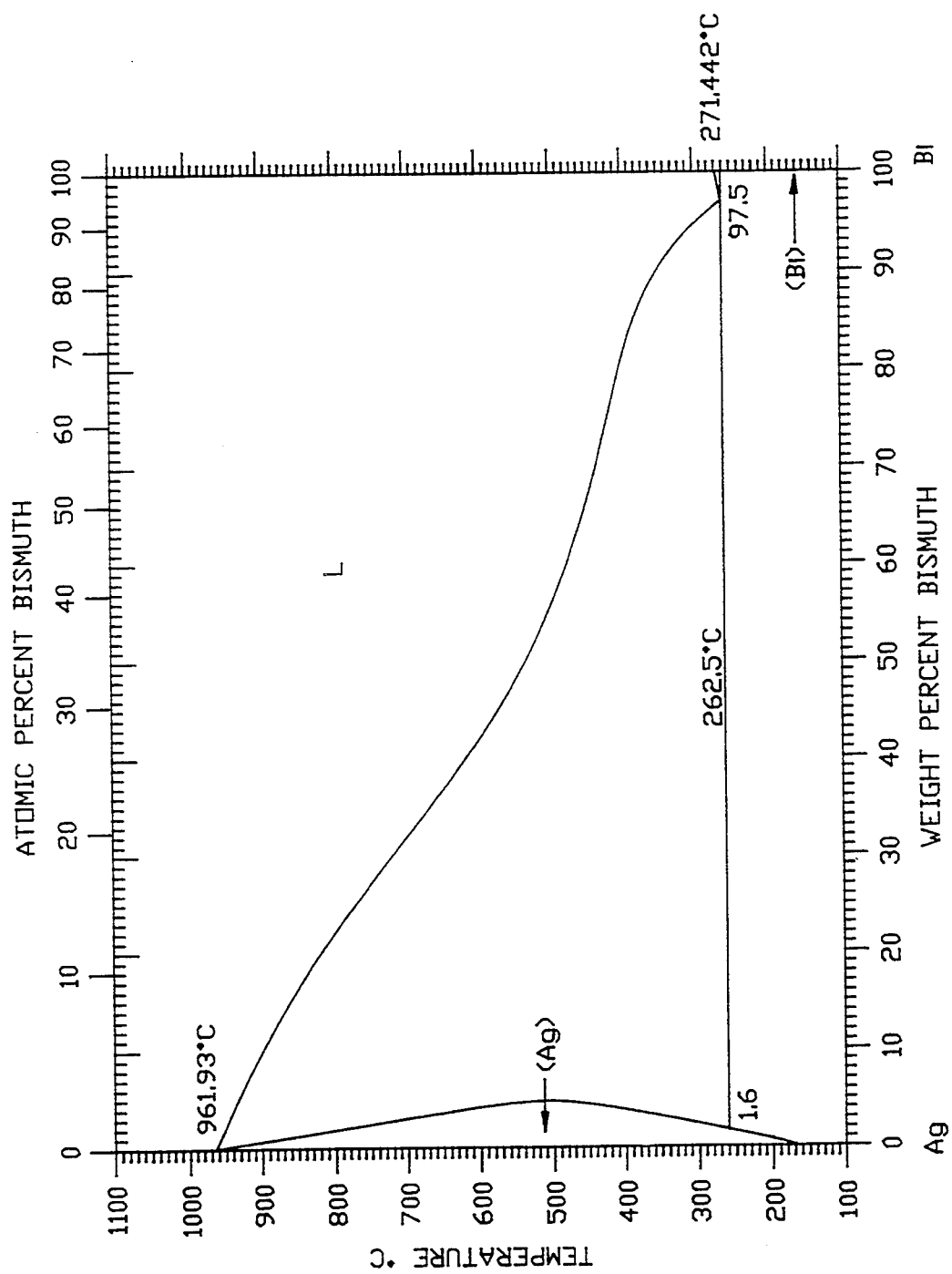
FIG. 1 is a chart showing a tin-silver phase diagram.

Wettability tests on existing, commercial lead-free solders, revealed that the eutectic tin-silver solder, e.g., 96.5Sn-3.5Ag (wt. %), exhibited good performance. The tin-silver phase diagram is shown in FIG. 1. However, the melting temperature, is not desirable for many PWB applications. It was discovered that an addition of bismuth resulted in the desired depression of the melting point of the eutectic tin-silver solder. Bismuth exhibits a substantial solid solution field with tin down to approximately room temperature. The solubility of bismuth in tin can lead to melting point depression without the large scale formation of a low temperature tertiary phase.

Figure 2:
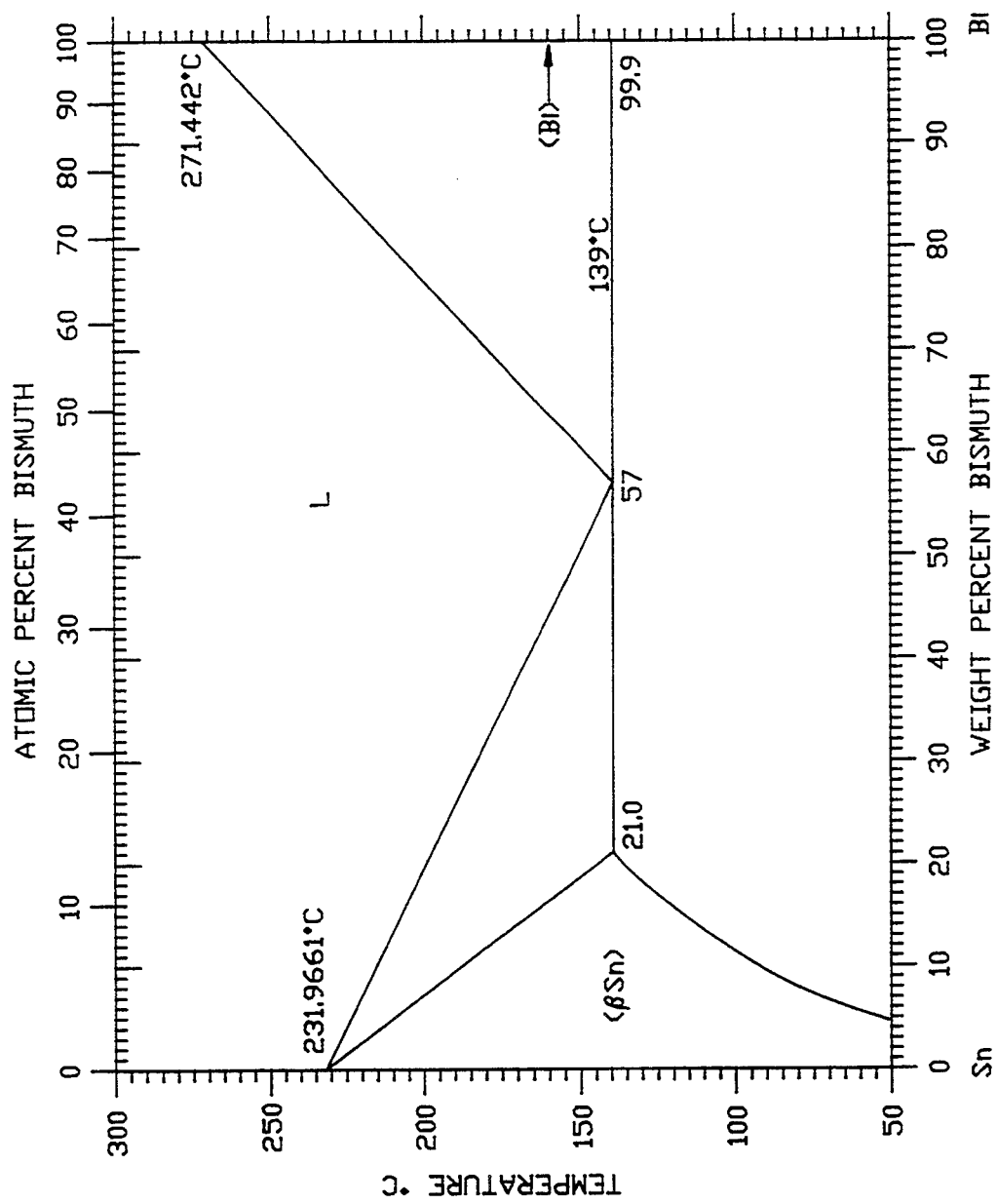
FIG. 2 is a chart showing a tin-bismuth phase diagram.

The melting temperature of bismuth is 271° C., above that of tin. The tin-bismuth phase diagram is shown in FIG. 2. The (BSn) field shows that down to ~50° C., up to 5 wt. % of bismuth will remain in solution with tin to effect melting point depression without low temperature phase precipitation. As long as there is <5 wt. % Bi, the tin-bismuth eutectic, (low melting temperature (139° C.)) phase would not be expected to form. Therefore, bismuth has the desired property of having a finite solid solubility with tin.

Figure 3:
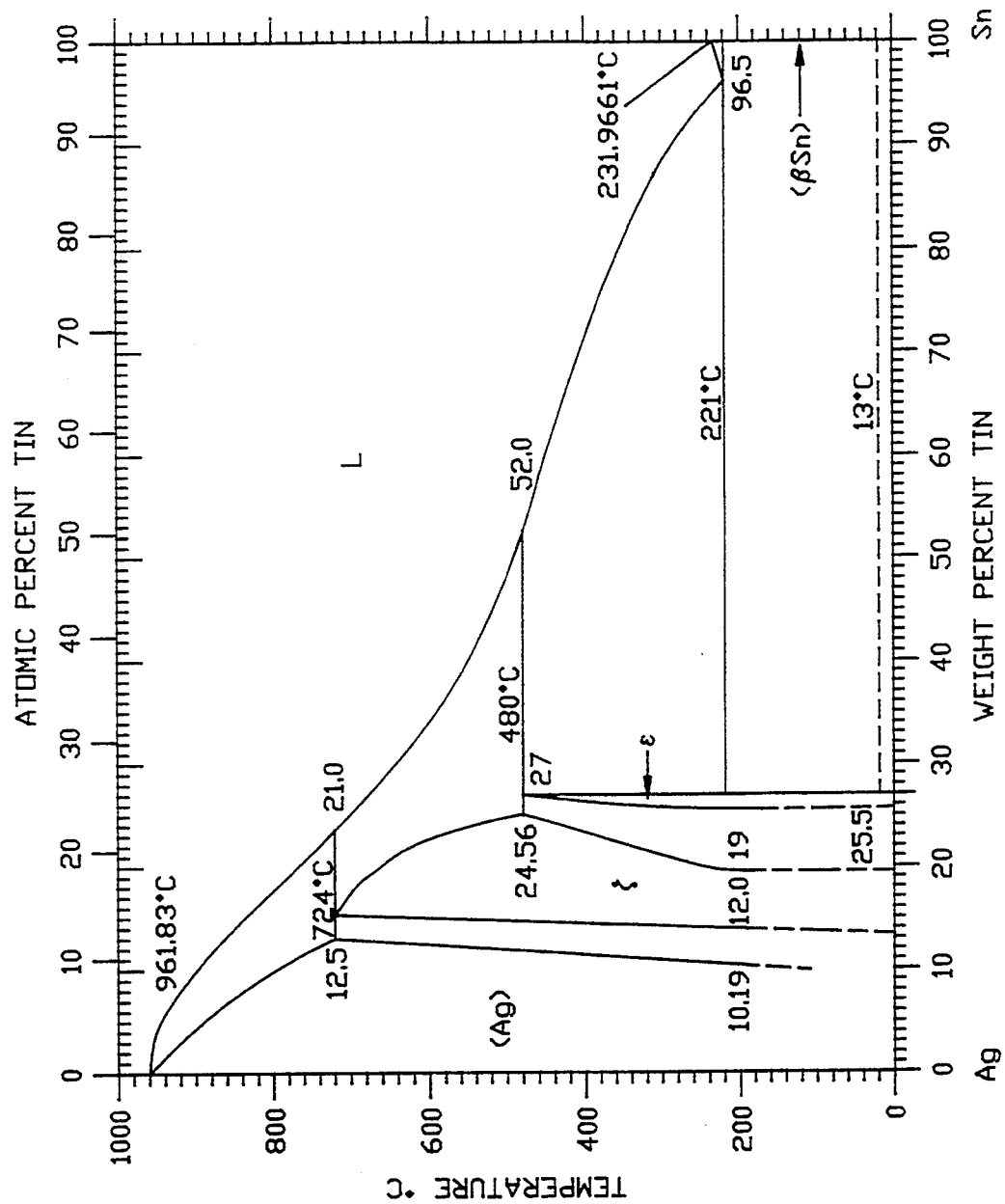
FIG. 3 is a chart showing a silver-bismuth phase diagram.

The bismuth-silver phase diagram is shown in FIG. 3. There is no significant solubility between either element at or below 50° C. A bismuth content range of 0 to 7 wt. % with respect to tin, and the silver content to satisfy the eutectic composition, establishes the silver-bismuth ratio in the 0 to 50 wt. % bismuth area in FIG. 3. For solder processing at temperatures of below 260° C. (down to solidification), no liquid phases between silver and bismuth are likely to be retained upon solidification, diminishing the likelihood of the formation of low temperature tertiary phases. Also, tertiary phase formation is not expected upon cool down of the solder in the solid state because bismuth and silver are mutually insoluble. The absence of a silver-bismuth interaction causes the bismuth to "associate" solely with Sn, thereby maximizing the melting point depression of the solder with a minimum amount of bismuth. Since the solder would likely be liquid past 221° C., bismuth diffusion kinetics should be very fast to allow its homogeneous distribution within the tin-rich phase.

The present invention is further illustrated by the following examples:

EXAMPLES

Figure 4:
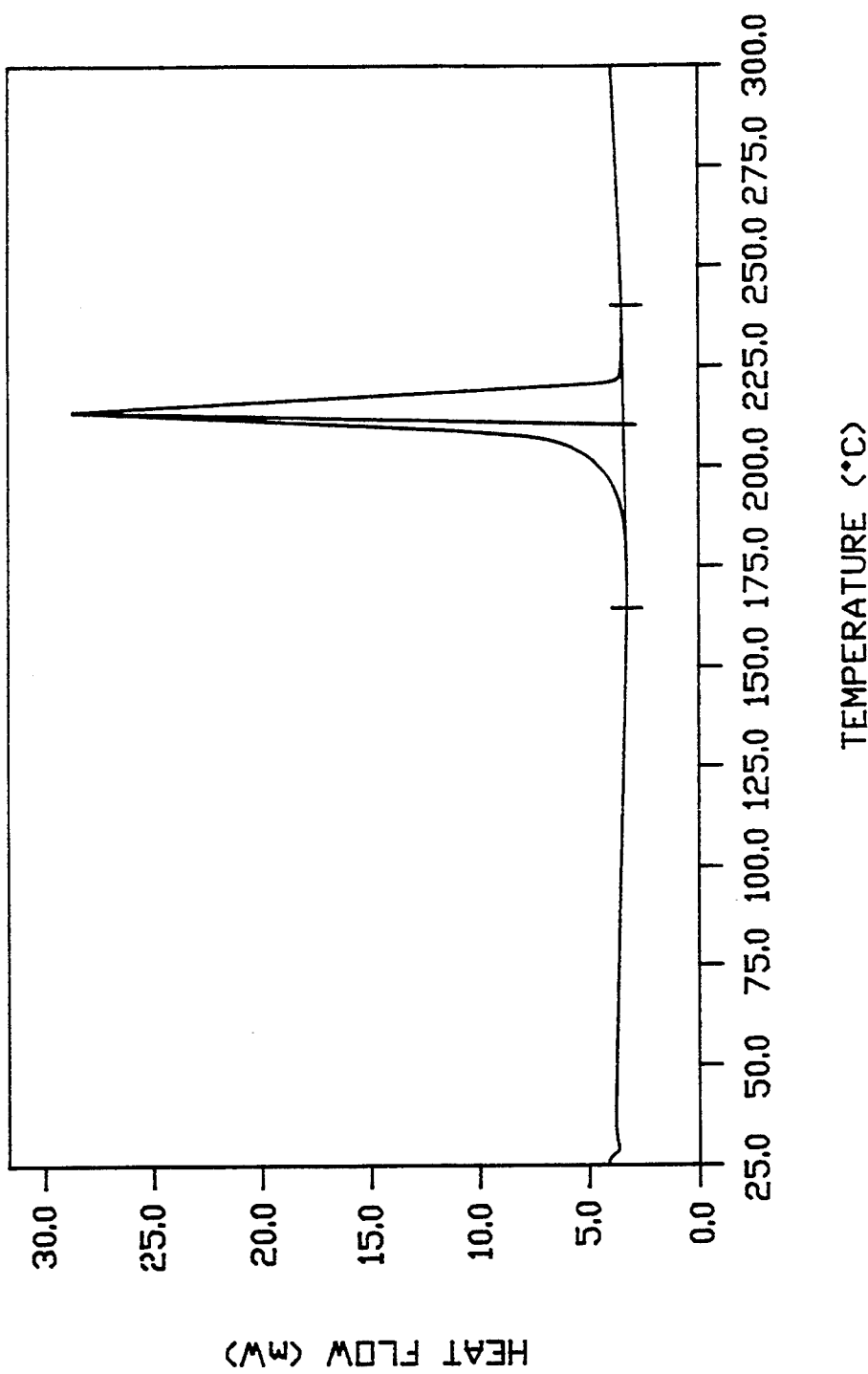
FIG. 4 is a chart showing a Differential Scanning Calorimeter (DSC) plot for 91.84Sn3.33Ag-4.83Bi alloy.

The confirmation of the melting properties of the alloy Sn—Ag—Bi was determined by differential scanning calorimetry (DSC) at a heating rate/cooling rate of 10° C./min. over a temperature range of from 25° C. to 300° C. The first alloy tested was 91.84Sn-3.33Ag-4.83Bi (wt. %). In this material, the proportion of silver to tin is the same as that in the eutectic Sn—Ag composition. The bismuth is 5 wt. % with respect to tin. The DSC plot appears in FIG. 4. There is a distinguishable melting transition with an onset (melting point) of 211.3° C.; no other phase transitions (peaks) were observed, which corresponds with predictions based on the above analysis. The melting peak is relatively broad, indicating the possibility of a solidus and liquidus temperature. This property tends to reduce defects in surface mount assembly. The onset (melting) temperature is within the desired range mentioned earlier.

Alloy compositions in the range of 1-7 wt. % Bi were fabricated in order to establish a trend of melting and wettability properties as a function of Bi content. The alloys and their melting (onset) temperatures from DSC plots (duplicate run, 10° C./min) and contact angles from wettability tests are listed in Table 1, below:

TABLE 1

| Alloy composition (wt. %) | Melting (onset) Temp °C. | Contact Angle° |
| --- | --- | --- |
| 60.00Sn—40.0Pb | 183 | 17 ± 4 |
| 96.50Sn—3.50Ag | 221.0 | 43 ± 4 |
| 95.57Sn—3.47Ag—0.96Bi | 218.1 | 39 ± 1 |
| 94.63Sn—3.44Ag—1.93Bi | 215.9 | 39 ± 2 |
| 93.70Sn—3.40Ag—2.90Bi | 215.1 | 40 ± 1 |
| 92.76Sn—3.37Ag—3.87Bi | 212.2 | 38 ± 1 |
| 91.84Sn—3.33Ag—4.83Bi | 211.3 | 31 ± 4 |
| 90.48Sn—3.28Ag—6.23Bi | 207.7 (136.8) | — |

The last alloy with 6.23Bi showed a second peak (upon heating in the first ran) at 136.8° C. indicating that the Sn phase had been saturated with Bi, causing the formation of 58Bi-42Sn within the solder. The reversible, low temperature peak was observed upon cooling.

In addition to the melting properties of the variable bismuth alloys, wettability tests were performed on the above solders to determine their suitability for electronics applications. (See P. Vianco, "An Overview of the Meniscometer/Wetting Balance technique for Wettability Measurements," *The Metal Science of Joining*, ed. M. Cieslak, et al, (TMS, Warrendale, Pa., 1992), p. 265 for a description of wettability measurement techniques. Tests were also performed on the 96.5Sn-3.5Ag and 60Sn-40Pb solders for baseline data. The wettability was assessed through the contact angle measured by the meniscometer/wetting balance technique. The lower the contact angle, the better the wettability. A rosin-based, mildly activated (RMA) flux was used for all of the tests. The solder bath temperatures were (1) 60Sn-40Pb, 260° C.; (2) 96.5Sn-3.5Ag, 248° C.; and (3) the Sn—Bi—Ag solders, 245° C. The values of the contact angle of the solders are listed in Table 1, above. Very good wettability was observed for the Sn—Ag4.83Bi alloy with a contact angle of 31°. This value is less than those of the lower Bi-containing materials (which are also considered very acceptable) and much improved with respect to that of 96.5-Sn-3.5Ag. Although the wettability performance of the Sn—Ag-4.83Bi is poorer than that of the tin-lead standard, it is clearly acceptable for electronics assembly. Adequate wettability of the Sn—Ag-4.83Bi solder was also demonstrated by the assembly of prototype surface mount circuit boards using a solder paste made of the alloy together with an RMA flux. The assembly process was performed in an infrared belt furnace under inert atmosphere (nitrogen) atmosphere. The relatively low number of defects arising from the initial manufacturing process demonstrated the feasibility of this solder for the large scale, furnace assembly process used to fabricate electronic products.

A second property of importance to manufacturability of circuit boards with the new solder(s) is the ability to fabricate the solder into powder which is ultimately used to make solder paste for surface mount and mixed technology circuit board assemblies (both printed wiring boards and hybrid microcircuits). The presence of three elements in the alloy increases the likelihood that the composition of the powder will differ from that of the initial charge caused by the actual fabrication process. Powder was formed from a 25 lb charge of alloy with a composition of 91.4±1.4Sn-3.26±0.05Ag-4.79±0.15Bi as determined by Atomic Emission Spectroscopy/Induced Couple Plasma (AES/ICP) analysis technique. The composition of the produced powder was determined to be 89.9±1.7Sn-3.60±0.06Ag-4.69±0.14Bi by the AES/ICP technique. The differences are well within the measurement error (95% confidence interval). Therefore, the solder alloy can be formed into powder for the fabrication of solder paste for printing applications.

A third property is the ability to form wire of out of the new solder alloy. A sample of the solder was cast into 0.095 inch diameter rod. The rod was then formed to a rectangular cross section of 0.034 in ×0.046 in; the area reduction of the cross section was 77%. Metallographic cross sections of the wire showed only a minimal amount of cracking at isolated locations on the wire perimeter (as expected from a small scale forming process which is not optimized for industrial production). Therefore, the solder can be readily formed into wire which is required for the hand assembly of through-hole circuit boards or the repair/rework of all types of electronic products (surface mount, through-hole, and mixed technologies). Wires of lesser Bi content were also formed in a similar manner without noticeable cracking by visual inspection.

A fourth property of importance to the use of solders in electronic products is the strength of the solder. Surface mount circuit boards (imidazole coated copper traces) were assembled with 50 mil pitch, 68 I/O plastic leaded chip carriers (PLCC), 24 I/O small outline integrated circuit (SOIC) packages, and 1206 chip capacitors using the 91.84Sn-3.33Ag-4.83Bi solder. Units were also assembled with the 63Sn-37Pb and 96.5Sn-3.5Ag solders. The strength of the solder joints on the 68 I/O PLCCs was evaluated by pulling a minimum of 10 individual leads from the joints using a mechanical test machine. The pull strength in pounds for 63 Sn-37Pb, 96.5Sn-3.5Ag, and 91.84Sn-3.33Ag-4.83Bi are 4.0±0.7, 3.6±0.6, and 3.6±0.7 lb, respectively. This data shows that the strength of the joints formed with the Sn—Ag—Bi solder are comparable to those made with the tin-lead and tin-silver baseline alloys.

Finally, the cost of the Sn-Ag-Bi solder would not differ significantly from that of 96.5Sn-3.5Ag. The price per pound of tin, silver, and bismuth in 1992 was $2.92, $70.22, and $2.65, respectively (Source U.S. Department of Interior, Mineral Commodity Summaries, Jan. 1993, and Minerals Yearbook, 1990). Since bismuth will replace some of the tin and silver content and its cost is below that of either component, the price difference between 96.5Sn-3.5Ag and the Sn—Ag—Bi solder(s) will be minimal. Although the cost of bulk Sn—Ag—Bi solder (based on the cost of 96.5 Sn-3.5Ag alloy) would be nearly three times that of 60Sn-40Pb alloy, the cost differential quickly diminishes when the alloys are formed into paste. Moreover, for large pot assembly processes (e.g., wave soldering or drag soldering) which would require a costlier capital investment to fill the volume with the Sn—Ag—Bi solder as opposed to a Sn—Pb eutectic or near-eutectic alloy, the small amount of solder actually used in the joints on the circuit board would minimize the impact to the product cost.

In summary, the novel lead-free electronic solders have been discovered having the composition with a eutectic tin to silver ratio and with a bismuth addition x, in the range of $0 < x < 5$ wt. % bismuth based on the content of tin.

The inventive solder compositions may be prepared by taking a molten eutectic tin-silver alloy, adding a calculated amount of bismuth metal to obtain the desired composition and resulting melting point, and cooling the resulting alloy to obtain the inventive lead-free solder composition. A preferred alloy composition according to the present invention is 91.84Sn-3.33Ag-4.83Bi (wt. %) which is equivalent to a eutectic tin-silver alloy with an addition of 5 wt. % bismuth based on the weight of tin present.

The particular compositions discussed above are cited merely to illustrate a particular embodiment of this invention. It is contemplated that the practice of the invention may involve other compositions as long as the principle, the use of a bismuth addition to lower the melting point of an eutectic alloy of tin and silver for use as a lead-free solder in electronics applications, is followed. The invention contemplates other derivative compositions. It is intended that the scope of the invention be defined by the claims appended hereto.

We claim:

1. A solder alloy composition for electronic assembly applications consisting essentially of tin, silver, and bismuth, said tin and silver being present in a ratio substantially equal to the eutectic composition of the tin-silver binary, wherein said silver-tin ratio is substantially 0.036, and said bismuth being present in an amount greater than 3 percent by weight based on the total composition weight, and the bismuth remains in solid solution in the solder alloy at room temperatures and the solder alloy composition has a melting temperature no greater than 219° C.

2. The solder composition of claim 1 wherein the addition of bismuth, x, is in the range of $3.0 < x < 4.83$ weight percent of the total composition of the solder.

3. The solder composition of claim 1, wherein the onset melting temperature is in the range of about 205° C. to about 218° C.

4. The solder alloy composition of claim 1, wherein the tin is present in the amount of 91.84 percent by weight, said silver is present in the amount of 3.33 percent by weight and said bismuth is present in the amount of 4.83 percent by weight, each based on the total weight of the composition.

5. The solder composition of claim 4, wherein the onset melting temperature is on the range from 211° C. to 213° C.

6. A solder alloy composition for electronic assembly applications consisting essentially of tin, silver, and bismuth, said tin component being present in an amount in the range of about 91.0 to about 96.0 percent by weight, based on total composition weight, said silver component being present in an amount in the range of about 3.2 to about 3.5 percent by weight based on composition total weight, wherein the tin and the silver components are present in the eutectic ratio of substantially 0.036, and the bismuth being present in an amount greater than 3 percent by weight of the total composition weight.

7. The solder composition of claim 6, wherein the onset melting temperature is on the range from 211° C. to 219° C.

8. A low toxicity solder alloy composition consisting of tin, silver and bismuth, wherein said tin and silver being present in a ratio substantially equal to the eutectic composition of a tin-silver binary alloy, said silver-tin ratio being substantially 0.036, and said silver being present in an amount greater than 3 percent by weight of the total solder composition weight, and said bismuth being present in an amount greater than 3 percent by weight of the total solder composition weight, such that bismuth remains in solid solution in the solder alloy at room temperatures.

* * * * *